United States Patent [19]

Veith et al.

[11] 3,879,714

[45] Apr. 22, 1975

[54] METHOD OF RECORDING INFORMATION WITH A PICTURE STORAGE TUBE AND READING WITHOUT ERASING THE INFORMATION

[75] Inventors: Werner Veith; Wolfgang Welsch, both of Munich, Germany

[73] Assignee: Siemens Aktiengesellschaft, Berlin and Munich, Germany

[22] Filed: Apr. 18, 1973

[21] Appl. No.: 352,231

Related U.S. Application Data

[62] Division of Ser. No. 171,885, Aug. 16, 1971, abandoned.

[30] Foreign Application Priority Data

Aug. 20, 1970 Germany ........................... 2041496

[52] U.S. Cl. ........................... 340/173 CR; 313/392

[51] Int. Cl... G11c 11/42; G11c 11/32; H01j 31/26

[58] Field of Search .......... 340/173 CR; 313/65 AB, 313/66, 392

[56] References Cited

UNITED STATES PATENTS

| | | | |
|---|---|---|---|
| 3,011,089 | 11/1961 | Reynolds | 313/65 AB |
| 3,458,782 | 7/1969 | Buck et al. | 313/65 AB |
| 3,517,246 | 6/1970 | Chester et al. | 313/65 AB |
| 3,564,309 | 2/1971 | Hoeberechts et al. | 313/66 |
| 3,576,392 | 4/1971 | Hofstein | 313/65 AB |
| 3,641,510 | 2/1972 | Chen | 340/173 CR |

OTHER PUBLICATIONS

Luedicke et al., Optical Storage Utilizing Silicon Vidicon, Proceedings of the IEEE, 11/70, pp. 1865–1866.

*Primary Examiner*—Stuart N. Hecker
*Attorney, Agent, or Firm*—Hill, Gross, Simpson, Van Santen, Steadman, Chiara & Simpson

[57] ABSTRACT

A method of recording information with a picture storage tube having a memory signal plate of photo diodes, means for generating electron beam and means for deflecting the beam for scanning one side of a memory plate, the method including the steps of erasing the signal plate, writing or recording information on the plate by exposing the one side of the signal plate to radiation containing information to be recorded and reading the information from the plate characterized by changing the value of the potential applied to the signal plate for each of the steps of writing, reading and erasing with the value of the potential applied during the writing step being greater than the potential applied during the reading step and less than the potential applied during the erasing step so that the step of reading the photo diodes of the signal plate is accomplished without erasing the information contained thereon. Preferably, a voltage of +14 volts is applied during the reading step, a voltage of +20 volts is applied during the writing or recording step and erasing is accomplished by applying a voltage of approximately +50 volts.

7 Claims, 2 Drawing Figures

INVENTORS
Werner Veith
Wolfgang Welsch
BY:
Hill, Sherman, Meroni, Gross & Simpson

METHOD OF RECORDING INFORMATION WITH A PICTURE STORAGE TUBE AND READING WITHOUT ERASING THE INFORMATION

This is a division of application Ser. No. 171,885 filed Aug. 16, 1971, now abandoned.

BACKGROUND OF THE INVENTION

1. Field Of The Invention

The present invention is directed to an improved memory plate or screen for a picture storage tube and a method of utilizing the tube.

2. Prior Art

Photography of objects having a low luminosity is important in astronomy, electron beam microscopy and optical microscopy. With an ability to photograph an object having a low luminosity, it is possible to record objects at night and provide a device for nocturnal vision.

One method of recording a picture of objects having a low luminosity is by an exposing of a photographic plate for a prolonged time. After the exposure, the photographic plate must be developed and copies made and developed. Such process is time consuming and in certain applications the amount of time required is undesirable.

In television cameras of the vidicon type a screen or plate having a porous layer applied thereto is known. In these camera tubes, the exposing of the photoconductive plate creates an image thereon which is scanned by electron beam which creates during the scanning a video signal corresponding to the information recorded on the plate. However, the electron beam while scanning during the reading step erases the image or information recorded thereon which in certain applications is undesirable. Thus the memory capabilities of the screen are limited to a period between electron beam scan during the reading operation.

Another type of television picture camera which is the SEC tubes a porous layer is arranged on the memory plate or screen which layer consists of halides which produce a secondary emission that is utilized by being passed through a secondary electron multiplier to create the signal corresponding to the exposed plate. In both the vidicon and the SEC type tubes, the memory capabilities of the tube do not extend past the reading operation.

To satisfy the needs and requirements for recording a picture from an object having a low luminosity, it would be desirable to provide a memory plate or screen which when exposed can be directly read electrically to provide a video signal and with a video system. It is also desirable that the reading operation of the screen is a destruction free operation to allow repeated read outs and a low read out speed if desired.

SUMMARY OF THE INVENTION

The present invention is directed to a picture storage tube having a memory plate or screen utilizing a new multidiode technique on a silicon base and a method of using the tube. The screen comprises a signal plate of N-conductive materials, such as silicon, which has one surface provided with a plurality of spaced circular P-conductive portions which are isolated from one another by an insulating layer of silicon $SiO_2$ deposited on the surface of the base. The P-conductive portions and the N-conductive material of the base form the photodiodes and the insulating layer covers a peripheral portion of the P-conductive portion to insulate it from the electron beam of the tube and to form a circular frame around the peripheral edge thereof to reduce the exposed surface of the P-conductive portion to a circular surface of a smaller diameter than the P-conductive portion. In one embodiment the exposed surface of the P-conductive portions and the surface of the N-conductive signal plate are substantially coplanar and the layer of insulating material is substantially planar. In another embodiment of the invention, the P-conductive portions extend above the surface of the N-conductive signal plate which has furrows or grooves therearound and the insulating layer covers the grooves and embraces the edge of the P-conductive portions to insulate the peripheral edge thereof from the electron beam of the tube. The memory plate of the picture storage tube enables the repeated reading of the diodes without destroying the information contained thereon and the recording of information contained in ionized radiation such as electrons, gamma rays, and alpha rays.

Accordingly it is an object of the present invention to provide a picture storage tube having a memory plate which can be read by an electron beam without destruction of the information contained thereon.

Another object of the present invention is to provide a picture storage tube having a memory plate which can be utilized in a method of recorded information by being exposed to light and ionized radiation such as electrons, gamma rays, and alpha rays.

A still further object of the present invention is to provide a picture storage tube and a method of utilizing it to enable repeated read outs without erasing the information contained on the necessary plate.

Other objects, features and advantages will be readily apparent from the following description of the preferred embodiments taken in conjunction with the drawings, although variations and modifications may be effected without departing from the spirit and scope of the concept of the disclosure.

DESCRIPTION OF THE PREFERRED EMBODIMENTS

The principles of the present invention are particularly useful in a picture storage tube similar to a vidicon having a memory plate or screen disposed at one end of a sealed envelope with contains means for generating electron beam for reading, writing or erasing the plate which is deflected to scan the plate by a means for deflecting the beam. The means for generating the beam and the means for deflecting are substantially the same as those utilized in a vidicon type camera pickup tube.

Figure 1:
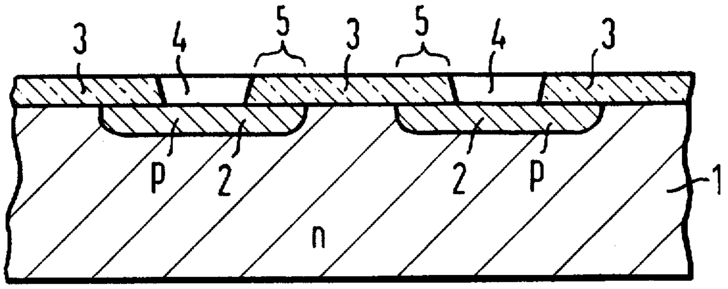
FIG. 1 is a partial cross sectional view of a memory plate according to the present invention.

The memory plate or screen as illustrated in FIG. 1 comprises a base member or plate 1 of an N-conductive material, such as silicon, which forms a signal plate. On a surface of the plate 1 in a space screen-like arrangement, a plurality of circular P-conductive portions 2 are provided which portions 2 can be produced by a customary diffusion process to form a PN layer at the interface between the portions 2 and the base 1. The P-conductive portions and the N-conductive base 1 coact to provide a plurality of photodiodes for the screen or plate. The surface of the base or plate 1 is covered by a consistent insulating layer 3 of $SiO_2$ which layer also covers a peripheral portion of the P-conductive portions 2 to form annular insulating zone or control rings 5 which acts as a frame about each of the holes or windows 4 in the layer 3 which enables exposure of the center circular portion of the P-conductive portions 2. The diameter of the exposed central surface of the portions 2 are less than the diameter of the portion 2 so that the frames 5 insulates a peripheral portion of each of the P-conductor from exposure to electron beam of the picture storage tube.

As illustrated, in FIG. 1, the surface of the base of N-conducting material and the P-conducting portions are substantially coplanar with the layer 3 being substantially planar. The technique for producing the screen or memory plate is well known in the art.

Figure 2:
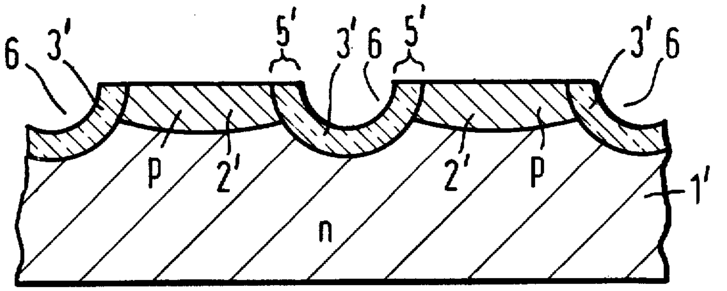
FIG. 2 is a partial cross section of a second embodiment of a memory signal plate of the present invention.

In FIG. 2, a mesa structure is illustrated as another embodiment of the invention. The signal plate of the memory comprises a base plate 1' of the N-conductive silicon material with the P-conductive portions 2' distributed on the surface of the base 1' as islands which extend above the surface thereof. Surrounding each of the islands of P-conductive portions 2', are grooves 6 formed in the base member 1'. The insulating layer 3' of $SiO_2$ covers the grooves 6 and tightly embraces the peripheral edge of the P-conductive portions 2' to form a circular frame like arrangement or control rings 5' which reduces the surface of the portions 2' exposed to the electron beam of the picture storage tube. The screen of either FIGS. 1 and 2 is placed in the envelope of the picture storage tube with the portions 2 and 2' and the insulating layers facing the electron beam.

In each of the embodiments the insulating zones 5 of the frame like structure are used only for storage which zones surround the portions 2 of each diode in a closed manner and have a higher negative charge to cause a steering effect on the electron beam during the reading operation. Due to the limited thickness and height of the insulating edges, the zones or rings 5 exert as a result of their geometric shape a definite steering of the electron beam on the P-conductive surfaces and each of the control rings 5 are very well insulated in relation to each other.

The erasing, writing, and reading of the information of the photographic image on the screen or plate is carried out for example by the following operation.

For erasing, the plate 1, for example, is placed at a voltage of +50 volts with respect to the cathode of the tube. Due to exceeding the inversion voltage at the target of the coplanar control and secondary electron emission of the target side facing the electron beam, the target side is placed at the same surface potential. The high potential enables erasing of any signals contained on the target side of the signal plate. Subsequently, the voltage of the base member 1 is reduced to +20 volts for example whereby the electron beam permanently scans the target. At this voltage, the picture storage tube is ready for taking pictures because the target surface facing the electron beams is charged uniformly to cathode potential that is to 0 volts however the picture previously taken or imposed thereon has been erased.

If an image is projected on the target, the P-conductive portions 2 of the exposed photo diodes are brought to a positive potential of for example +8 volts maximum while the unexposed portions remain at 0 volts. As a result of the capacity coupling, the surface of the rings 5 of the exposed diodes are brough to a +8 volts while the rings for each of the unexposed diodes is at 0 volts. If for example, in FIG. 1, the diameter of the holes or windows 4 is six microns and the diameter of the P-conductive portions 2 is eight microns, the $SiO_2$ ring 5 has a capacity of approximately $9 \times 10^{-16}$ F at an $SiO_2$ thickness of 0.8 microns. The blocking layer capacity of the exposed photo diode is $3 \times 10^{-15}$ F. The scanning electron rays stays as a rule 80 n seconds (nanoseconds) on a photodiode, and thereby its impedence for the ring 5 is 50 MΩ, and for the surface of the exposed P-conductive portion uncovered by the holes or windows 4 has an impedence of 100 MΩ. In other words, the rings 5 of the exposed diodes have a discharge constant of 45 n seconds and the photodiodes have a discharge time constant of 300 n seconds. Thus the electron beam discharges the ring 5 but hardly discharges the photodiodes and after the scanning, the photodiodes still has a potential of about 6 volts.

Upon the completion of the writing operation, the base member 1 is switched for reading to 14 volts for example whereby the potential of the P-conductive vary depending upon whether the particular diode was in an exposed or in an unexposed condition during the writing operation. For the exposed photodiodes the P-conductive portion goes to 0 volts and the ring 5 associated therewith is provided by capacity coupling with a potential of -6 volts. During the writing operation, the P-conductive portions 2 and the rings 5 of the unexposed photodiodes have a blocking voltage of 20 volts which in comparision with the exposed diodes was so high that the capcity was low and the blocking current very high. Thus during the writing operation, the unexposed photodiodes and their associated rings 5 remained at 0 volts. With the reduction of the voltage from 20 to 14 volts on the signal plate 1, the potential of the P-conductive portions 2 and their associated rings 5 of the unexposed photodiodes adjust to approximately −6 volts. With a scanning time of 33 m seconds for example, the electron beams will impact upon the P zone of the photo diodes which remained unexposed during the picture taking to discharge these diodes to 0 volts, but the electron beam will not hit the negatively charged insulator ring 5 associated with the unexposed photodiodes. Thus a negative image is created. After the first reading operation with the unexposed diodes and their associated rings 5 being at 0 volts, and the exposed diodes being at 0 volts with their rings at a −6 volts, a subsequent reading of the photodiodes will produce a signal at the exposed diodes which can be utilized to read the signal. To destroy or erase the information or image on the photodiodes, a voltage such as the +50 volts applied to the signal plate 1 is required. The memory plate illustrated in FIG. 2 would function in same manner as the above described plate.

With the picture storage tube having the signal plate described hereinabove the incidenting light may be replaced with other ionizing radiation. To be specific electrons from 1 to 10 kv may be utilized to record an image on the screen with the electrons being directed on the rear side of the target just as the light. The electrons used for forming the image may originate from a photodiode having an external photo effect; however the actual storage or memory process remains independent of the incident light for the image. It should also be pointed out that other ionizing radiations such as gamma rays and alpha rays can be utilized to record the image on to the signal plate of the target of the picture tube.

Although various minor modifications may be suggested by those versed in the art it should be understood that we wish to embody within the scope of the patent warranted hereon all such modifications that reasonably and properly come within the scope of our contribution to the art.

We claim:

1. In a method of recording information with a picture storage tube having a memory signal plate of photo diodes, means for generating an electron beam and means for deflecting the beam for scanning one side of the memory plate, said method including the steps of erasing the signal plate, writing information on the plate by exposing the other side of the signal plate to radiation containing information to be recorded and reading the information from the plate, the improvement of changing the value of the potential applied to the signal plate for each of the steps of writing, reading, and erasing with the value of the potential applied during the writing step being greater than the potential applied during the reading step and less than the potential applied during the erasing step so that the step of reading the photo diodes of the signal plate is accomplished without erasing the information contained thereon.

2. In a method according to claim 1, wherein the step of writing by exposing the signal plate with radiating includes exposing with ionizing radiation.

3. In a method according to claim 2, wherein said ionizing radiation is gamma rays.

4. In a method according to claim 2, wherein said ionizing radiation is alpha rays.

5. In a method according to claim 2, wherein said ionizing radiation is electrons.

6. In a method of recording information with a picture storage tube having a memory signal plate, means for generating an electron beam and means for deflecting the beam for scanning one side of the memory plate, said plate being a signal plate of an N-conductive material having a plurality of circular P-conductive portions spaced on a surface of the N-conductive material and forming a plurality of spaced photo diodes therewith, said N-conductive material having a consistent layer of insulating material of $SiO_2$ on the surface of the signal plate between the P-conductive portions with the insulating material covering a peripheral edge portion of said P-conductive portions to form a circular storage and control ring around each P-conductive portion, said method including the steps of erasing the signal plate, writing information on the plate by exposing the other side of the plate with radiation containing the information to be recorded, and reading the information from the plate, the improvement in the method comprising changing the value of potential applied to the signal plate for each of the steps of writing, reading and erasing with the value of potential applied during the writing step being greater than the potential applied during the reading step and less than the potential applied during the erasing step so that the step of reading the photo diodes of the signal plate is accomplished without erasing the information contained thereon and enables subsequent reading steps.

7. In a method of recording information according to claim 6, wherein the voltage applied during the reading step is approximately +14 volts, wherein the voltage applied during a writing step is approximately + 20 volts and wherein the voltage applied during the erasing step is approximately + 50 volts.

* * * * *